United States Patent [19]
Kasenga et al.

[11] Patent Number: 4,762,639
[45] Date of Patent: Aug. 9, 1988

[54] METHOD OF MAKING TERBIUM ACTIVATED YTTRIUM ALUMINATE PHOSPHOR

[75] Inventors: Anthony F. Kasenga, Towanda; Jeffrey N. Dann, Sayre, both of Pa.

[73] Assignee: GTE Products Corporation, Stamford, Conn.

[21] Appl. No.: 76,978

[22] Filed: Jul. 23, 1987

[51] Int. Cl.$^4$ .............................................. C09K 11/80
[52] U.S. Cl. ............................................. 252/301.4 R
[58] Field of Search ................................ 252/301.4 R

[56] References Cited
U.S. PATENT DOCUMENTS
4,469,619 9/1984 Ohno et al. .................. 252/301.4 R

OTHER PUBLICATIONS

Ohno et al., II, "J. Electrochem. Soc.", 1986, vol. 133, No. 3, pp. 638–643.

Primary Examiner—Jack Cooper
Attorney, Agent, or Firm—Donald R. Castle; L. Rita Quantrini

[57] ABSTRACT

A $Y_3Al_5O_{12}$:Tb and method for producing the phosphor are disclosed. The method invloves forming a uniform mixture of source materials for $Y_3Al_5O_{12}$:Tb phosphor and barium fluoride with the barium fluoride being present in the mixture at a level of from about 0.254 to about 7.61 weight percent, and firing the mixture at an elevated temperature to react the source material to form the phosphor. The phosphor has an improved brightness of at least about 75% over a phosphor of the same type produced without the barium fluorides.

1 Claim, No Drawings

METHOD OF MAKING TERBIUM ACTIVATED YTTRIUM ALUMINATE PHOSPHOR

This invention relates to a method of making $Y_3Al_5O_{12}$:Tb phosphors in which barium fluoride in controlled concentrations is used in the initial mixture. This results in improved luminescence and in the desired small particle size and narrow particle size distribution.

BACKGROUND OF THE INVENTION

The phosphor $Y_3Al_5O_{12}$:Tb exhibits green emission under electron excitation and is used in special CRT applications as heads up displays and projection TV systems. The phosphor is useful in that it exhibits linear burn resistance, more linear than $Y_3(Al,Ga)_5O_{12}$:Tb and thus is utilized under high beam current densities. The phosphor is not as efficient in luminescence output as $Y_3(Al,Ga)_5O_{12}$:Tb, therefore is not significantly utilized in these applications.

A method by which $Y_3Al_5O_{12}$:Tb can be made more efficient would be desirable.

U.S. Pat. No. 4,479,886 relates to making $Y_3Al_5O_{12}$:Ce phosphor in which barium fluoride is added to the finished phosphor to increase the efficiency of converting UV radiation to visible radiation.

U.S. Pat. Nos. 4,070,301 and 4,141,855 disclose the addition of a barium compound to a cerium activated phosphor prepared from yttria and alumina to enhance the intensity of UV emission of the $YAlO_3$:Ce.

A publication entitled "Effect of $BaF_2$ on the Synthesis of the Single Phase Cubic $Y_3Al_5O_{12}$:Tb", by K. Ohne and T. Abe, J. Electrochem. Soc., Vol. 133, No. 3 (March 1986) discusses a high concentration of $BaF_2$ (20%) on $Y_3Al_5O_{12}$:Tb phosphor but does not consider particle size.

SUMMARY OF THE INVENTION

In accordance one aspect of this invention, there is provided a method for producing a $Y_3O_5O_{12}$:Tb phosphor which involves forming a uniform mixture of source materials for $Y_3Al_5O_{12}$:Tb phosphor and barium fluoride with the barium fluoride being present in the mixture at a level of from about 0.254 to about 7.61 weight percent, and firing the mixture at an elevated temperature to react the source materials to form the phosphor. The phorphor has an improved brightness of at least about 7.5% over a phosphor of the same type produced without the barium fluoride.

In accordance with another aspect of this invention, there is provided the phosphor produced by the above described method.

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention.

The phosphor of the present invention is a cathode ray phoshor having the formula $Y_3Al_5O_{12}$:Tb. The approximate content of the $BaO:6.6Al_2O_3$ phase is from about 0.4 to about 5 weight percent.

In the method for making this phosphor, the first step is forming a uniform mixture of source materials for $Y_3Al_5O_{12}$:Tb phosphor and barium fluoride. These source materials are typically yttrium oxide, aluminum oxide, and terbium oxide. Relative amounts of these materials will be apparent in the Example that follows. The amount of barium fluoride in the mixture is from about 0.254 to about 7.61 weight percent. This amount of barium fluoride results in an increase in luminescence of at least about 7.5% over that of the phosphor produced without barium fluoride. The preferred amount of barium fluoride is from about 0.254 to about .761 weight percent of the mixture. This preferred amount of barium fluoride results in increasing the luminescence by at least about 7.5% with a slightly reduced dispersed weight due to an improved particle size and distribution.

The mixture is formed by conventional methods for mixing and blending dry solids.

The blended mixture is fired at an elevated temperature to react the source materials to form the $Y_3Al_5O_{12}$:Tb phosphor. The firing is done usually at about 1600° C. for about 6 hours in air. The barium fluoride acts as a flux.

The resulting phosphor cake can then be classified if desired, to remove the out of size material. This is done most typically by screening the phosphor through a 200 mesh screen.

The luminescence characteristics after CRT excitation of a logarithmic $BaF_2$ addition are shown in Table 1. The addition of barium fluoride can increase the relative brightness of the phosphor by as much as about 12.8% with a three-fold increase in dispersed weight. The preferred level of barium fluoride is from about 0.254% to about 0.761% by weight of the mixture. It has been found that these levels result in from about a 7.5% to about 11.2% increase in the brightness of the phosphor with a slight decrease in dispersed weight as opposed to a phosphor produced without barium fluoride.

The particle size characteristics as measured by Coulter Counter on the logarithmic $BaF_2$ addition are shown in Table 2. At the preferred levels of $BaF_2$ (0.254 to 0.761 weight percent), the particle size (50%) is reduced by about 1 micrometer to the 5 to 7 micrometer range and the particle size distribution is improved as exhibited by a narrower QD of 0.31 and by reducing the coarse fraction (>about 20 micrometers) to 1.0–6.0% range. This improved particle size and distribution results in a reduced dispersed weight by about 0.4 mg/cm$^2$ as shown in Table 1. Higher additions of $BaF_2$ from about 2.54 to about 7.61 weight percent result in larger particle sizes (50%) and more coarse fractions (>20 micrometers) although the overall distribution (QD) is further improved. These larger particle sizes are reflected in higher dispersed weights.

Further characterization by x-ray diffraction of the phosphor of this invention is exhibited in Table 3. From these analyses it can be seen that addition of barium fluoride decreases the formation of $YAlO_3$ and $Al_2O_3$ phases and slightly increases the formation of $BaO:6-.6Al_2O_3$ phase. The x-ray diffraction intensity at 2.69 A from the $Y_3Al_5O_{12}$ phase (the luminescent material) is increased up to about 0.761% by weight $BaF_2$ with severe drop off at higher concentrations. This is indicative of the improved crystallinity of the luminescent phase.

To more fully illustrate this invention, the following nonlimiting example is presented. All parts, portions, and percentages are on a weight basis unless otherwise stated. Example A mixture of about 541.94 g $Y_2O_3$, about 795.92 g $Al(OH)_3$ and about 44.86 g $Tb_4O_7$ is intimately blended. To about 23.05 g of this mixture is added various amounts of $BaF_2$ as listed below and the material is further blended.

| Test | Weight Dry Blend grams | Weight $BaF_2$ grams | Wt. % $BaF_2$ |
|---|---|---|---|
| 1 | 23.05 | 0 | 0 |
| 2 | 23.05 | 0.0585 | 0.254 |
| 3 | 23.05 | 0.1753 | 0.761 |
| 4 | 23.05 | 0.5845 | 2.54 |
| 5 | 23.05 | 1.753 | 7.61 |

This blend is then fired in a programmed furnace at about 1600° C. for about 6 hours in air. This firing is done by ramping up at about 367° C./hour to about 1600° C., and held at about that temperature for about 6 hours, and the furnace is then cooled. The resulting material is broken up and sieved through a 200 mesh screen. These materials result in CRT luminescence, particle size. and x-ray diffraction characteristics as listed in Tables 1, 2, and 3 respectively.

TABLE 1

CRT Luminescence Characteristics of $Y_3Al_5O_{12}$:Tb

| Sample | % $BaF_2$ | Weight Dispersed (mg/cm$^2$) | Trans-mission | Relative Brightness | Color Coordinates x | y |
|---|---|---|---|---|---|---|
| 1 | 0 | 3.2 | 20 | 75.8 | 0.344 | 0.519 |
| 2 | 0.254 | 2.8 | 20 | 83.3 | 0.348 | 0.531 |
| 3 | 0.761 | 2.9 | 18 | 87.0 | 0.353 | 0.544 |
| 4 | 2.54 | 10.5 | 22 | 88.6 | 0.355 | 0.551 |
| 5 | 7.61 | 10.5 | 20 | 88.6 | 0.355 | 0.551 |
| 6* | 0 | 3.2 | 20 | 100 | 0.347 | 0.535 |

*$Y_3(AlGa)_5O_{12}$:Tb

TABLE 2

$Y_3Al_5O_{12}$:Tb
Particle Size Characteristics
Coulter Counter
100 micrometers
Sonic

| Sample | % $BaF_2$ | 50% | Q.D. | % >20 micrometers |
|---|---|---|---|---|
| 1 | 0 | 7.0 | 0.48 | 11.9 |
| 2 | 0.254 | 5.6 | 0.35 | 6.0 |
| 3 | 0.761 | 6.1 | 0.31 | 1.0 |
| 4 | 2.54 | 19.0 | 0.26 | 47.2 |
| 5 | 7.61 | 13.4 | 0.25 | 12.1 |

TABLE 3

$Y_3Al_5O_{12}$:Tb
X-ray Diffraction Characteristics
Peak Height Intensities in "counts/sec"

| Sample | % $BaF_2$ | $Y_3Al_5O_{12}$ 2.69Å | $YAlO_3$ 2.62Å | $Al_2O_3$ 2.55Å | $BaO:6, 6Al_2O_3$ 2.51Å |
|---|---|---|---|---|---|
| 1 | 0 | 4182 | 732 | 314 | — |
| 2 | 0.254 | 5445 | 15 | 213 | 23 |
| 3 | 0.761 | 5762 | — | 75 | 49 |
| 4 | 2.54 | 3180 | — | 65 | 85 |
| 5 | 7.61 | 3237 | — | — | 155 |

While there has been shown and described what are at present considered the preferred embodiments of the invention, it will be obvious to those skilled in the art that various changes and modifications may be made therein without departing from the scope of the invention as defined by the appended claims.

What is claimed is:

1. The method of making $Y_3Al_5O_{12}$:Tb phosphor, said method comprising:
   (a) forming a uniform mixture of source materials for $Y_3Al_5O_{12}$:Tb phosphor and barium fluoride with said barium fluoride being present in said mixture at a level of from about 0.254 to about 0.761 weight percent; and
   (b) firing said mixture at an elevated temperature to react said source materials to form $Y_3Al_5O_{12}$:Tb phosphor having an improved brightness of at least about 7.5% over the phosphor prepared as above absent said barium fluoride, with the 50% size of said phosphor prepared as above with $BaF_2$ as measured by Coulter Counter technique being from about 5 to about 7 micrometers in diameter and with from about 1% to about 6% of the phosphor having a size of greater than about 20 micrometers in diameter.

* * * * *

UNITED STATES PATENT AND TRADEMARK OFFICE
CERTIFICATE OF CORRECTION

PATENT NO. : 4,762,639

DATED : August 9, 1988

INVENTOR(S) : Anthony F. Kasenga and Jeffrey N. Lann

It is certified that error appears in the above-identified patent and that said Letters Patent are hereby corrected as shown below:

```
   Header Page
 Column 2, line 5    -   delete "Quantrini" and insert
       - Quatrini --

Header Page
 Column 2, line 9 of the Abstract - delete "75%" and insert
       - 7.5% -
```

Signed and Sealed this

Twentieth Day of December, 1988

Attest:

DONALD J. QUIGG

*Attesting Officer*  *Commissioner of Patents and Trademarks*